(12) United States Patent
Wu et al.

(10) Patent No.: US 11,453,743 B2
(45) Date of Patent: Sep. 27, 2022

(54) THERMOSET EPOXY RESIN, ITS PREPARING COMPOSITION AND MAKING PROCESS THEREOF

(71) Applicant: CHANDA CHEMICAL CORP., Taipei (TW)

(72) Inventors: Chien-Hsin Wu, Taipei (TW); Ying-Chi Huang, Taipei (TW); Kuan-Ting Chen, Taipei (TW); Chia-Hsuan Lin, Taipei (TW); Sheng-Hong A. Dai, Taipei (TW); Ru-Jong Jeng, Taipei (TW)

(73) Assignee: CHANDA CHEMICAL CORP., Taipei (TW)

( * ) Notice: Subject to any disclaimer, the term of this patent is extended or adjusted under 35 U.S.C. 154(b) by 9 days.

(21) Appl. No.: 16/893,614

(22) Filed: Jun. 5, 2020

(65) Prior Publication Data

US 2021/0380756 A1 Dec. 9, 2021

(51) Int. Cl.
| | |
|---|---|
| *C08G 59/24* | (2006.01) |
| *C08G 59/28* | (2006.01) |
| *C08G 59/30* | (2006.01) |
| *C08G 59/40* | (2006.01) |
| *C08G 59/62* | (2006.01) |
| *C08G 59/68* | (2006.01) |
| *C08G 59/06* | (2006.01) |
| *C08L 83/10* | (2006.01) |
| *C08G 77/42* | (2006.01) |

(52) U.S. Cl.
CPC ............ *C08G 59/245* (2013.01); *C08G 59/28* (2013.01); *C08G 59/304* (2013.01); *C08G 59/306* (2013.01); *C08G 59/308* (2013.01); *C08G 59/4057* (2013.01); *C08G 59/623* (2013.01); *C08G 59/686* (2013.01); *C08G 59/688* (2013.01); *C08G 2150/00* (2013.01); *C08G 2170/00* (2013.01)

(58) Field of Classification Search
None
See application file for complete search history.

(56) References Cited

U.S. PATENT DOCUMENTS

| 4,105,634 A | * | 8/1978 | Hanson | C08G 59/066 525/523 |
| 4,767,832 A | * | 8/1988 | Marx | C08G 59/182 525/523 |

FOREIGN PATENT DOCUMENTS

| DE | 2043645 A | * | 3/1972 | ......... C08G 18/2845 |
| DE | 2062068 A | * | 6/1972 | ......... C08G 18/2845 |
| GB | 1326669 A | * | 8/1973 | ......... C08G 18/2845 |
| JP | 08301967 A | * | 11/1996 | |

\* cited by examiner

*Primary Examiner* — Randy P Gulakowski
*Assistant Examiner* — Ha S Nguyen
(74) *Attorney, Agent, or Firm* — WPAT, PC

(57) ABSTRACT

A thermoset epoxy resin, its preparing composition and making process are disclosed. In particular, the thermoset epoxy resin is glycidyl ether of diphenolic bis-carbamate and formed by curing a one component epoxy composition and has a general structure as shown in formula (1).

12 Claims, 15 Drawing Sheets

THERMOSET EPOXY RESIN, ITS PREPARING COMPOSITION AND MAKING PROCESS THEREOF

TECHNICAL FIELD OF THE INVENTION

The present invention relates to a thermoset epoxy resin, its preparing composition and making process. In particular, the thermoset epoxy resin is formed by curing a one component epoxy composition which comprises a self-hardener.

BACKGROUND OF THE INVENTION

Epoxy has a wide range of applications, including metal coatings, use in electronics/electrical components, paint brush manufacturing, and adhesives for structural and other purposes. In general, uncured epoxy resins have only poor mechanical, chemical and heat resistance properties.

Typically, epoxy-amine curing systems are one of the most widely applied formulations to adhesives, sealants, and coatings. However, the curing reaction usually occurs spontaneously at ambient temperature. To avoid the epoxy-amine reaction, epoxy resin and amine hardener have to be mixed immediately before the application of the curable composition. Accordingly, one component epoxy composition are highly desirable because they allow manufacturers and consumers of epoxy compositions to avoid more complex packaging, and to avoid the additional mixing step necessary before a separately packaged epoxy resin.

Based on the aforementioned description, a thermoset epoxy resin with good thermal and mechanical properties, a stable one component epoxy composition and its making process are required for developing.

SUMMARY OF THE INVENTION

In the invention, a self-hardener represents a latent curing agent. In particular, the self-hardener is formulated with an epoxy compound to form a one component epoxy composition or formulation.

In the invention, a hardener represents a room temperature curing agent, such as diamines, but not limited to the room temperature curing agent.

In one objective, the present invention provides a thermoset epoxy resin that has a structure as shown in formula (1). The thermoset epoxy resin is glycidyl ether of diphenolic bis-carbamate and has good thermal and mechanical properties. One of the invented thermoset epoxy resin has strain more than 250%.

Typically, Ep has a structure as shown in formula (2); where (A)~ is obtained from an aromatic epoxy resin containing structure selected from the group consisting of formula (3) and formula (4); or obtained from a aliphatic epoxy resin containing structure selected from the group consisting of formula (5), formula (6), formula (7), formula (8) and their combinations.

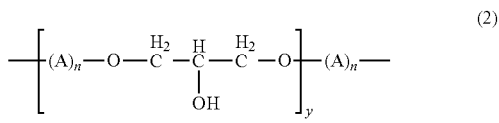

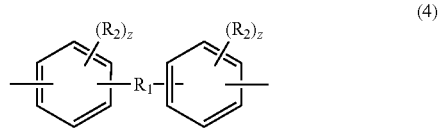

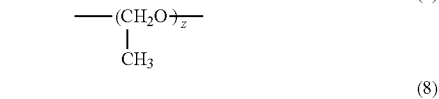

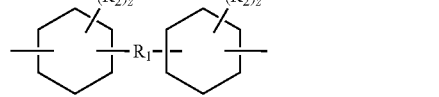

$R_1$ is independent of one another, and comprises the cyclic hydrocarbon with carbon number 1 to 5; polyphenols with carbon number 6 to 10; linear hydrocarbons or halogen substituted hydrocarbons with carbon number 1 to 20; carbonyl, imine, amide, phosphoryl, phosphonate, phosphine, carbonyl, carboxyl, silyl, ether, thioether, sulfonyl, selenoether, ketone, aldehyde or ester.

$R_2$ is independent of one another, and comprises hydrogen, halogen, alkyl, alkenyl, alkynyl, hydrocarbyl, hydroxyl, amino, a nitro, or alkoxyl with carbon number 1 to 5.

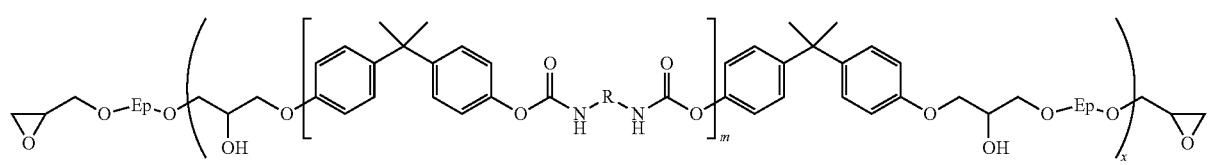

In general, R group is derived from an aliphatic diamine, an aromatic diamine, a diaminosiloxane or a polyether diamine; where m is an integer of 0-5 and x is a numbers between 1 to 25.

Ep is independent of one another and derived from epoxy resins.

Z is independently integral number between 1 to 5; and where m is an integer of 0-5 and x is a numbers between 1 to 25.

In another objective, the present invention provides one component epoxy composition for preparing thermoset epoxy resin having the structure as shown in formula (1). The one component epoxy composition comprises a self-hardener having a structure as shown in formula (9) and a epoxy compound, wherein weight ratio of the self-hardener to the epoxy compound is 0.5~20.

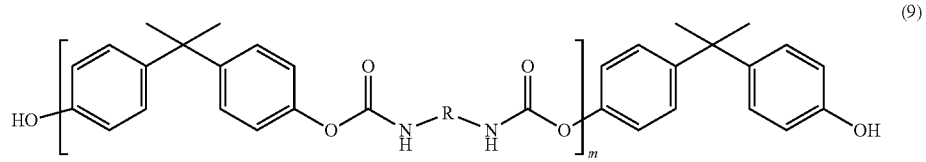

In general, R is derived from an aliphatic diamine, an aromatic diamine, a diaminosiloxane or a polyether diamine, and m is an integer of 0-5.

Generally, the one component epoxy composition further comprises additives. The additives include modifiers, accelerators, activators, and/or catalysts. Some additives promote the one component epoxy composition curing by catalytic action, and others may be participate directly in the curing reaction for forming the thermoset polymeric network.

The invented one component epoxy composition has very good composition compatibility. As a result, the one component epoxy composition does not occur phase-separation. The epoxy compound or the self-hardener does not precipitated out from the one component epoxy composition during a period of long-time storage.

In still another objective, the invention provides a process for making thermoset epoxy resin containing carbamate groups. The process comprises following steps.

Step 1: Provide a self-hardener having a structure as shown in formula (9) and an epoxy compound, wherein weight ratio of the self-hardener to the epoxy compound is 0.5~20, where R is derived from an aliphatic diamine, an aromatic diamine, a diaminosiloxane or a polyether diamine, and m is an integer of 1-5.

Accordingly, the present invention provides (1) an improved thermal and mechanical thermoset epoxy resin; (2) one component epoxy composition with good stored stability and compatibility; and (3) an environmental-friendly process for making the thermoset epoxy resin containing carbamate groups.

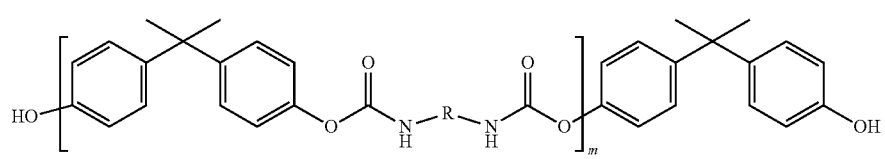

Step 2: Mix the self-hardener and the epoxy compound in a solvent to form a pre-epoxy product.

Step 3: Perform a curing reaction to have the pre-epoxy product to form the thermoset epoxy resin containing carbamate groups.

The process for making thermoset epoxy resin containing carbamate groups is able to solve pollution problem because a waste polymer, such as waste polycarbonate, is use as the raw materials of the self-hardener in the process. Moreover, carbon dioxide is not release from the process. Hence, the process effectively prolongs carbon dioxide in carbon cycle.

In one example, the curing reaction is performed between 150 and 350° C.

Figure 13:
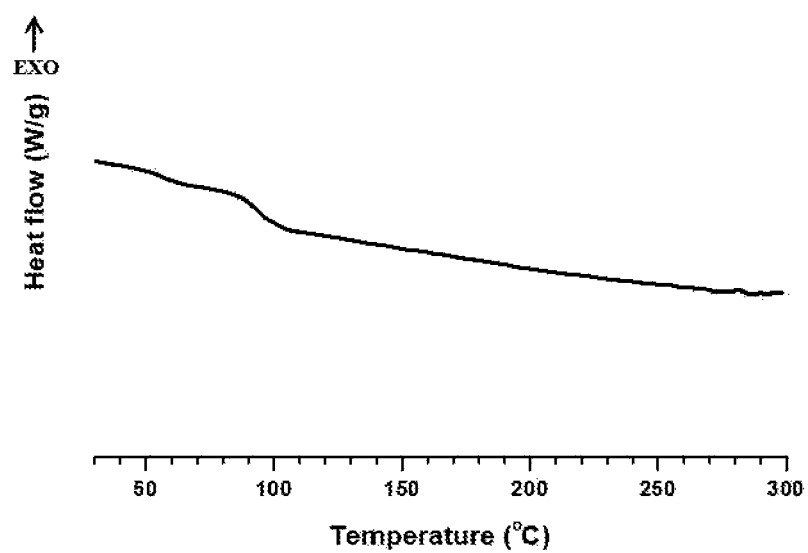
Figure 14:
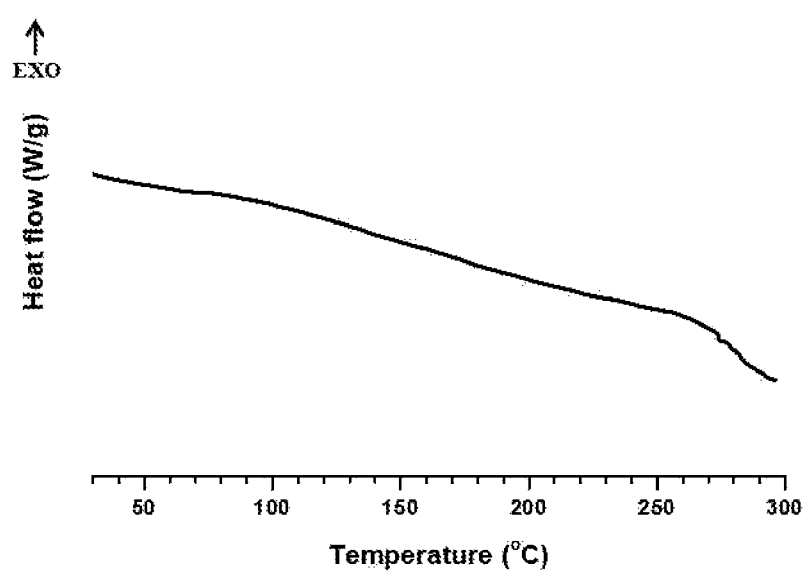
Figure 15:
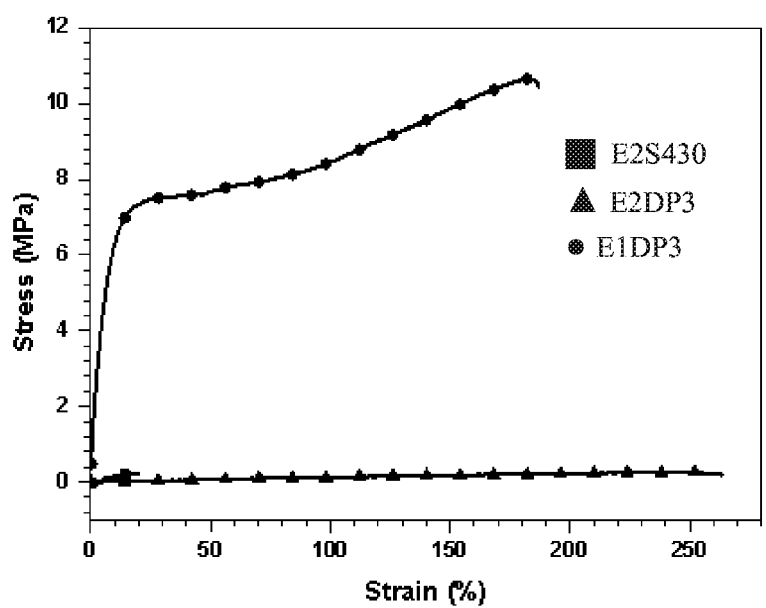

FIG. 13 is a DSC curve of thermoset epoxy resin synthesizing from E1DP2;

FIG. 14 is a DSC curve of thermoset epoxy resin synthesizing from E2DP2; and FIG. 15 is a plot of stress vs. strain of E2S430, E1DP3 and E2DP3.

BRIEF DESCRIPTION OF THE PREFERRED EMBODIMENTS

In a first embodiment, the present invention discloses a thermoset epoxy resin that has a structure as shown in formula (1).

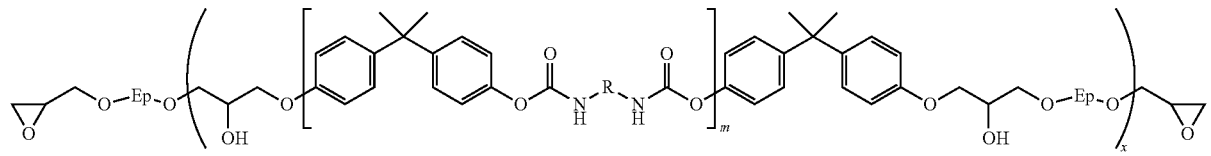
(1)

The thermoset epoxy resin is glycidyl ether of diphenolic bis-carbamate.

In one example of the first embodiment, R is derived from an aliphatic diamine, an aromatic diamine, a diaminosiloxane or a polyether diamine, where m is an integer of 0-5 and x is a numbers between 1 to 25.

Ep is independent of one another and derived from epoxy resins.

Typically, Ep has a structure as shown in formula (2); where (A), is obtained from an aromatic epoxy resin containing structure selected from the group consisting of formula (3) and formula (4); or obtained from a aliphatic epoxy resin containing structure selected from the group consisting of formula (5), formula (6), formula (7), formula (8) and their combinations.

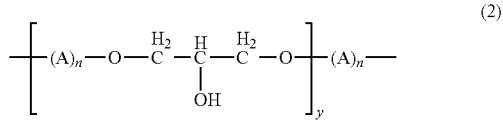
(2)

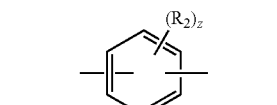
(3)

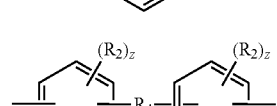
(4)

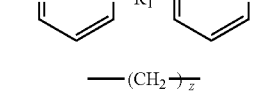
(5)

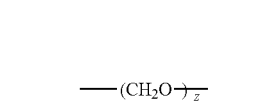
(6)

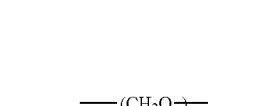
(7)

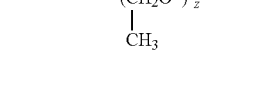
(8)

$R_1$ is independent of one another, and comprises the cyclic hydrocarbon with carbon number 1 to 5; polyphenols with carbon number 6 to 10; linear hydrocarbons or halogen substituted hydrocarbons with carbon number 1 to 20; carbonyl, imine, amide, phosphoryl, phosphonate, phosphine, carbonyl, carboxyl, silyl, ether, thioether, sulfonyl, selenoether, ketone, aldehyde or ester.

$R_2$ is independent of one another, and comprises hydrogen, halogen, alkyl, alkenyl, alkynyl, hydrocarbyl, hydroxyl, amino, a nitro, or alkoxyl with carbon number 1 to 5.

Z and n are independently integral numbers between 1 to 5, respectively; and where m is an integer of 0-5 and x is a numbers between 1 to 25.

In one example of the first embodiment, the aliphatic diamine comprises a C2-C40 linear chain aliphatic diamine or a C2-C40 branched chain aliphatic diamine. Preferably, the C2-C40 linear chain aliphatic diamine is 1,4-butyl diamine, 1,5-pentyl diamine or 1,6-hexyl diamine.

In one example of the first embodiment, the aromatic diamine comprises ortho-phenyldiamine, meta-phenyldiamine, para-phenyldiamine, 4,4'-oxydianiline or their combination.

In one example of the first embodiment, the diaminosiloxane is a diamino compound containing siloxane groups has a molecular weight between 150 and 10,000 Da.

The diamino compound containing siloxane or polysiloxane groups has structure as shown in formula (10).

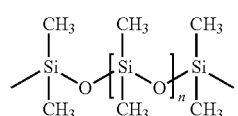
(10)

In one example of the first embodiment, the polyether diamine has a weight-average molecular weight between 100 and 5,000 Da. Preferably, the polyether amine is Jeffamine type polyether diamine.

In a second embodiment, the invention provides one component epoxy composition for preparing thermoset epoxy resin described in the first embodiment and has the structure as shown in formula (1). The one component epoxy composition comprises a self-hardener having a structure as shown in formula (9) and a epoxy compound, wherein weight ratio of the self-hardener to the epoxy compound is 0.5~20.

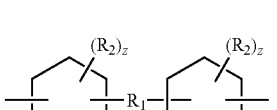

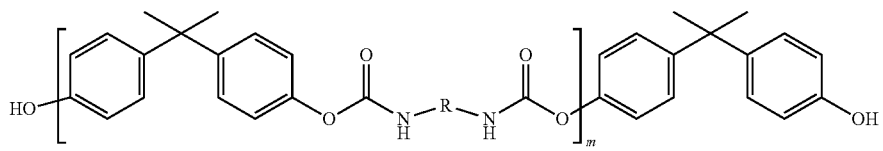
(9)

In general, R is derived from an aliphatic diamine, an aromatic diamine, a diaminosiloxane or a polyether diamine, and m is an integer of 0-5.

Typically, the one component epoxy composition further comprises additives. The additives include modifiers, accelerators, activators, and/or catalysts. Some additives promote the one component epoxy composition curing by catalytic action, and others may be participate directly in the curing reaction for forming the thermoset polymeric network.

In one example of the second embodiment, the additives comprise phosphorus containing catalysts or nitrogen containing catalysts.

The phosphorus containing catalysts include phosphonium halide catalysts, such as methyl or ethyl triphenylphosphonium iodide or bromide; trisubstituted (2,5-dihydroxyphenyl)phosphonium hydroxide inner salts; organic phosphine catalysts, such as triphenylphosphine or tributylphosphine; phosphonium salts of carboxylic acids, such as ethyltriphenylphosphonium acetate or its acetic acid complex or phosphonium phosphate esters; formylmethylenetriphenylphosphorane and its phosphonium halide salt precursors, e.g., formylmethyltriphenylphosphonium chloride.

The nitrogen containing catalysts comprises tertiary amines such as trimethylamine, triethylamine, triethanolamine, triisopropanolamine, benzyldimethylamine, alpha-methylbenzyl, dimethylamine, dimethylamino-methyl phenol, and tridimethyl aminomethyl phenol and their derivatives.

Other suitable embodiments are stannous salts of monocarboxylic acids, lithium benzoate, certain heterocyclic compounds such as the imidazole and benzimidazole compounds and salts thereof.

In one example of the second embodiment, the aliphatic diamine comprises a C2-C40 linear chain aliphatic diamine or a C2-C40 branched chain aliphatic diamine. Preferably, the C2-C40 linear chain aliphatic diamine is 1,4-butyl diamine, 1,5-pentyl diamine or 1,6-hexyl diamine.

In one example of the second embodiment, the aromatic diamine comprises ortho-phenyldiamine, meta-phenyldiamine, para-phenyldiamine, 4,4'-oxydianiline or their combination.

In one example of the second embodiment, the diaminosiloxane is a diamino compound containing siloxane groups has a molecular weight between 150 and 10,000 Da.

The diamino compound containing siloxane or polysiloxane groups has structure as shown in formula (10).

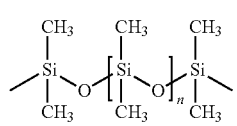
(10)

In one example of the second embodiment, the polyether diamine has a weight-average molecular weight between 100 and 5,000 Da. Preferably, the polyether amine is Jeffamine type polyether diamine In one example of the second embodiment, the epoxy compound has a structure as shown in formula (2). $(A)_n$ is obtained from an aromatic epoxy resin containing structure selected from the group consisting of formula (3) and formula (4); or obtained from a aliphatic epoxy resin containing structure selected from the group consisting of formula (5), formula (6), formula (7), formula (8) and their combinations.

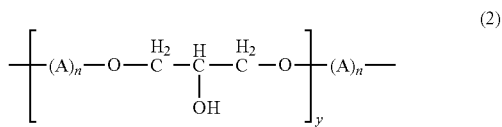
(2)

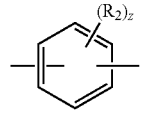
(3)

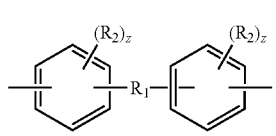
(4)

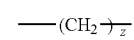
(5)

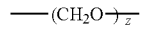
(6)

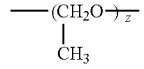
(7)

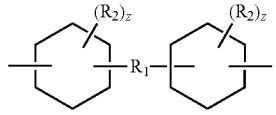
(8)

$R_1$ is independent of one another, and comprises the cyclic hydrocarbon with carbon number 1 to 5; polyphenols with carbon number 6 to 10; linear hydrocarbons or halogen substituted hydrocarbons with carbon number 1 to 20; carbonyl, imine, amide, phosphoryl, phosphonate, phosphine, carbonyl, carboxyl, silyl, ether, thioether, sulfonyl, selenoether, ketone, aldehyde or ester.

R2 is independent of one another, and comprises hydrogen, halogen, alkyl, alkenyl, alkynyl, hydrocarbyl, hydroxyl, amino, a nitro, or alkoxyl with carbon number 1 to 5.

Z and n are independently integral numbers between 1 to 5.

Preferably, the epoxy compound comprises polyglycidyl derivatives of bisphenol-A, polyglycidyl derivatives of polyether or polyglycidyl derivatives of phenol-formaldehyde resin. Preferably, the epoxy compound is bisphenol A diglycidyl ether (Trade name DER332) or diglycidyl ether of poly(propylene glycol) (Trade name DER736).

In one example of the second embodiment, the invented one component epoxy composition have a reaction temperature higher than 150° C., 160° C., 170° C., 180° C., 190° C. or 200° C.

In a third embodiment, the invention provides a process for making thermoset epoxy resin containing carbamate groups. The process comprises following steps.

Step 1: Provide a self-hardener having a structure as shown in formula (9) and a epoxy compound, wherein weight ratio of the self-hardener to the epoxy compound is 0.5~20, where R is derived from an aliphatic diamine, an aromatic diamine, a diaminosiloxane or a polyether diamine, and m is an integer of 1-5.

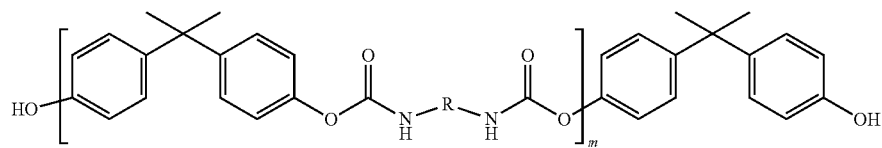

(9)

Step 2: Mix the self-hardener and the epoxy compound in a solvent to form a pre-epoxy product.

Step 3: Perform a curing reaction to have the pre-epoxy product to form the thermoset epoxy resin containing carbamate group.

The process for making thermoset epoxy resin containing carbamate groups is able to solve pollution problem because a waste polymer, such as waste polycarbonate, is use as the raw materials in the process. Moreover, carbon dioxide is not release from the process. Hence, the process effectively prolongs carbon dioxide in carbon cycle.

In general, additives include modifiers, accelerators, activators, and/or catalysts are used in the process for different purpose. For instance, some additives promote the one component epoxy composition curing by catalytic action, and others may be participate directly in the curing reaction for forming the thermoset polymeric network.

In one example of the third embodiment, the aliphatic diamine comprises a C2-C40 linear chain aliphatic diamine or a C2-C40 branched chain aliphatic diamine. Preferably, the C2-C40 linear chain aliphatic diamine is 1,4-butyl diamine, 1,5-pentyl diamine or 1,6-hexyl diamine.

In one example of the third embodiment, the aromatic diamine comprises ortho-phenyldiamine, meta-phenyldiamine, para-phenyldiamine, 4,4'-oxydianiline or their combination.

In one example of the third embodiment, the diaminosiloxane is a diamino compound containing siloxane groups has a molecular weight between 150 and 10,000 Da.

The diamino compound containing siloxane or polysiloxane groups has structure as shown in formula (10).

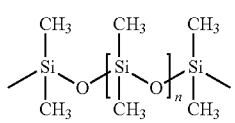

(10)

In one example of the third embodiment, the polyether diamine has a weight-average molecular weight between 100 and 5,000 Da. Preferably, the polyether amine is Jeffamine type polyether diamine.

In one example of the third embodiment, the epoxy compound has a structure as shown in formula (2). Symbol $(A)_n$ is obtained from an aromatic epoxy resin containing structure selected from the group consisting of formula (3) and formula (4); or obtained from a aliphatic epoxy resin containing structure selected from the group consisting of formula (5), formula (6), formula (7), formula (8) and their combinations.

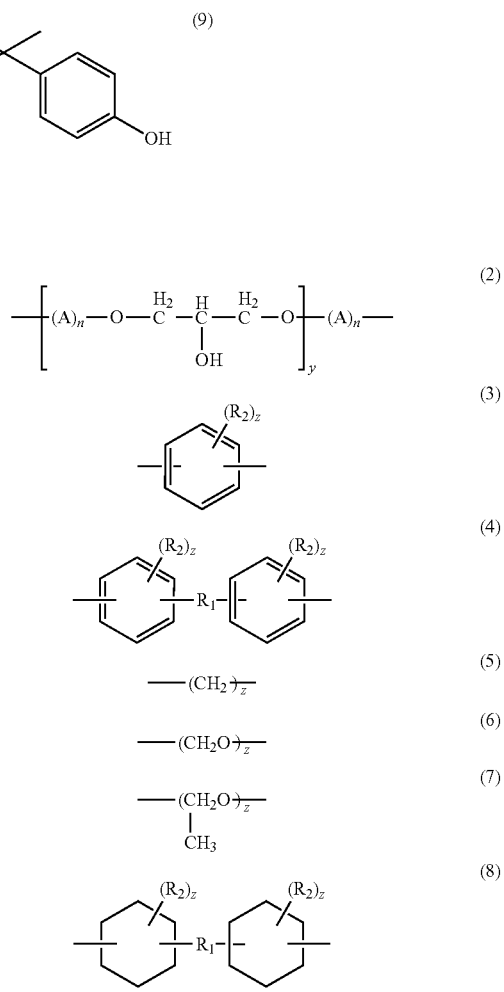

$R_1$ is independent of one another, and comprises the cyclic hydrocarbon with carbon number 1 to 5; polyphenols with carbon number 6 to 10; linear hydrocarbons or halogen substituted hydrocarbons with carbon number 1 to 20; carbonyl, imine, amide, phosphoryl, phosphonate, phosphine, carbonyl, carboxyl, silyl, ether, thioether, sulfonyl, selenoether, ketone, aldehyde or ester.

R2 is independent of one another, and comprises hydrogen, halogen, alkyl, alkenyl, alkynyl, hydrocarbyl, hydroxyl, amino, a nitro, or alkoxyl with carbon number 1 to 5.

Z and n are independently integral numbers between 1 to 5.

Preferably, the epoxy compound comprises polyglycidyl derivatives of bisphenol-A, polyglycidyl derivatives of polyether or polyglycidyl derivatives of phenol-formaldehyde resin. Preferably, the epoxy compound is bisphenol A diglycidyl ether (Trade name DER332) or diglycidyl ether of poly(propylene glycol) (Trade name DER736).

In one example, the curing reaction is performed between 150 and 350° C.

Working examples of the invention are described as following paragraphs.

Example 1: General Procedure for Preparing the Invented Self-Hardener

Provides a mixture contain a solvent, polycarbonate (PC) and a diamine. The diamine may have siloxane or polysiloxane groups. The mixture may further contain diphenyl carbonate. The solvent comprises diethyl ether, di-n-propyl ether, isopropyl ether, anisole, ethoxybenzene, propoxybenzene, butoxybenzene, 2-methoxytoluene, 3-methoxytoluene, 4-methoxytoluene, benzyl ethyl ether, diphenyl ether, dibenzyl ether, tetrahydrofuran, 2,3-dihydropyran, tetrahydropyran, 2-methyl tetrahydropyran, benzene, toluene, xylene, ethylbenzene, diethylbenzene or cyclohexylbenzene. Heat the aforementioned mixture to 50-200° C. for preparing a crude. After remove the solvent from the crude under vacuum distillation, the invented self-hardener is obtained. The self-hardener is an adduct of polycarbonate and the diamine. In general, the weight yield of the self-hardener is more than 95%. Therefore, 1 g of the polycarbonate and 1 g of the diamine produce 1.9~2 g of the self-hardener. Some representative reaction compositions for preparing the invented self-hardener are shown in TABLE 1.

TABLE 1

| Exp Code. | PC/ gram | Diamine/weight (gram) | Symbol of the self-hardener |
|---|---|---|---|
| H1 | 3.73 | 1,6-hexyl diamine/0.87 | DP1 |
| H2 | 5.16 | 1,6-hexyl diamine/1.20 | DP1 |
| H3 | 3.73 | Triethylene glycol diamine/1.10 | DP2 |
| H4 | 5.16 | Triethylene glycol diamine/1.53 | DP2 |
| H5 | 3.73 | Diamine containing siloxane groups (Ew = 430)/6.44 | DP3 |
| H6 | 5.16 | Diamine containing siloxane groups (Ew = 430)/8.91 | DP3 |
| H7 | 3.73 | Diamine containing siloxane groups (Ew = 800)/11.97 | DP4 |
| H8 | 5.16 | Diamine containing siloxane groups (Ew = 800)/16.56 | DP4 |
| H9 | 3.73 | Diamine containing siloxane groups (Ew = 2000)/32.94 | DP5 |
| H10 | 5.16 | Diamine containing siloxane groups (Ew = 2000)/45.56 | DP5 |

Characterization of the Self-Hardener

Structure of the self-hardeners DP1, DP2 and DP3 is characterized by $^1$H-NMR, respectively. All of the self-hardeners have a chemical shift at about 7.61 ppm which indicate that all of them have urethane groups.

Example 2: General Procedure for Making the Thermoset Epoxy Resin

To the self-hardener was added epoxy compound or epoxy resin, catalysts and solvents to form a mixture. The mixture was heat to 50~80° C. to form a pre-epoxy product. The pre-epoxy product was stand for overnight and then heat the pre-epoxy product in an oven to allow curing reaction occur. After curing reaction completed, the thermoset epoxy resin was obtained. Typically, the curing reaction condition comprises at least four heating stages. The first heating stage is at 60° C. for 3 hrs, the second heating stage is at 80° C. for 3 hrs, the third heating stage is at 150° C. for 3 hrs and the final heating stage is at 180° C. for 3 hrs.

The kind and usage of the self-hardener and the epoxy resin are list in TABLE 2. The self-hardeners are prepared according to the example 1 and list in TABLE 1. The experimental control groups (Exp No 13~20) use diamine compounds as hardener. DER332 is bisphenol A diglycidyl ether and DER736 is diglycidyl ether of poly(propylene glycol).

TABLE 2

| Exp No | Self-hardener or hardener(gram) | Epoxy resin/ gram | Weight ratio of hardener/ Epoxy resin | Catalyst/ gram | Symbol of the one component epoxy composition |
|---|---|---|---|---|---|
| 1 | Bisphenol-A(1.68 g) | DER332/3 | 0.56 | 0.05 | E1BPA |
| 2 | Bisphenol-A(2.32 g) | DER736/3 | 0.77 | 0.05 | E2BPA |
| 3 | DP1 obtained from H1 | DER332/3 | 1.53 | 0.08 | E1DP1 |
| 4 | DP1 obtained from H2 | DER736/3 | 2.12 | 0.09 | E2DP1 |
| 5 | DP2 obtained from H3 | DER332/3 | 1.61 | 0.08 | E1DP2 |
| 6 | DP2 obtained from H4 | DER736/3 | 2.23 | 0.10 | E2DP2 |
| 7 | DP3 obtained from H5 | DER332/3 | 3.39 | 0.13 | E1DP3 |
| 8 | DP3 obtained from H6 | DER736/3 | 4.69 | 0.17 | E2DP3 |
| 9 | DP4 obtained from H7 | DER332/3 | 5.23 | 0.19 | E1DP4 |
| 10 | DP4 obtained from H8 | DER736/3 | 7.24 | 0.25 | E2DP4 |
| 11 | DP5 obtained from H9 | DER332/3 | 12.23 | 0.40 | E1DP5 |
| 12 | DP5 obtained from H10 | DER736/3 | 16.91 | 0.54 | E2DP5 |
| 13 | 1,6-hexyl diamine (0.43 g) | DER332/3 | 0.14 | No added | E1HDA |
| 14 | 1,6-hexyl diamine (0.59 g) | DER736/3 | 0.20 | No added | E2HDA |
| 15 | Triethylene glycol diamine (0.54 g) | DER332/3 | 0.18 | No added | E1EDA |
| 16 | Triethylene glycol diamine (0.75 g) | DER736/3 | 0.25 | No added | E2EDA |

TABLE 2-continued

| Exp No | Self-hardener or hardener(gram) | Epoxy resin/ gram | Weight ratio of hardener/ Epoxy resin | Catalyst/ gram | Symbol of the one component epoxy composition |
|---|---|---|---|---|---|
| 17 | Diamine containing siloxane groups (Ewn = 430)/ (3.16 g) | DER332/3 | 1.05 | No added | E1S430 |
| 18 | Diamine containing siloxane groups (Ew = 430)/ (4.36 g) | DER736/3 | 1.45 | No added | E2S430 |
| 19 | Diamine containing siloxane groups (Ew = 2200)/ (16.16) | DER332/3 | 5.39 | No added | E1S2200 |
| 20 | Diamine containing siloxane groups (Ew = 2200)/ (22.33) | DER736/3 | 7.44 | No added | E2S2200 |

Characterization of the Thermoset Epoxy Resin

Figure 1:
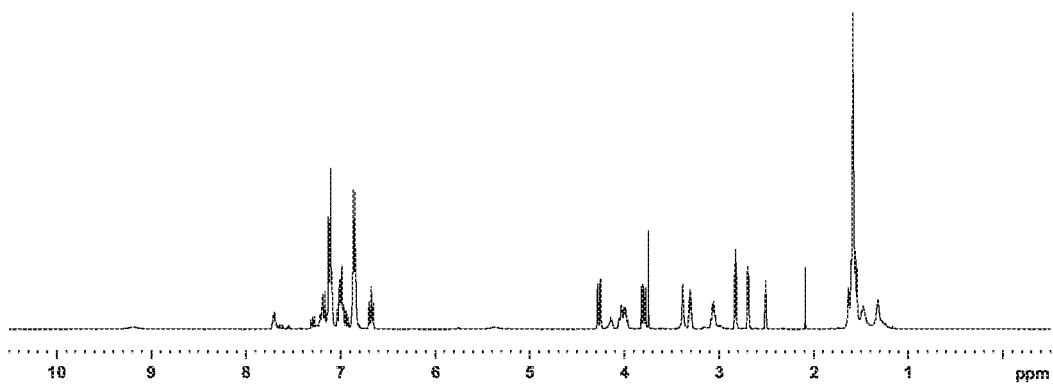
FIG. 1 is $^1$H-NMR spectrum of thermoset epoxy resin forming from E1DP1.
Figure 2:
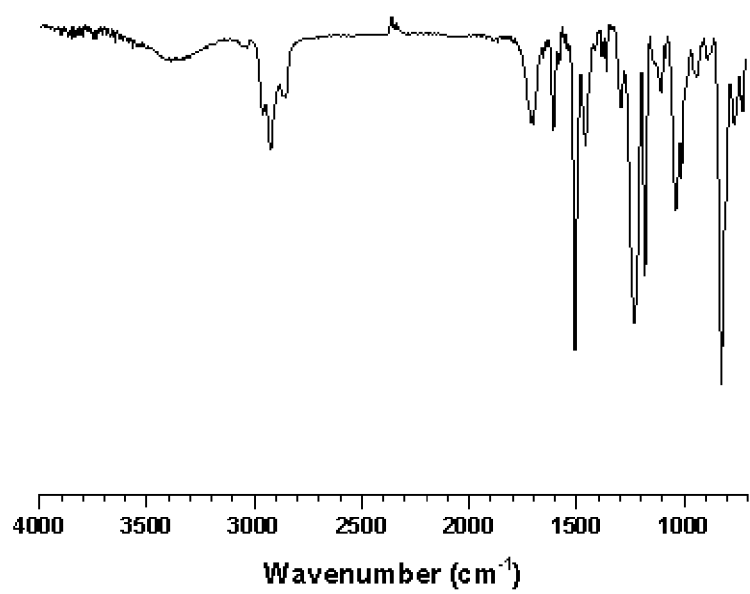
FIG. 2 is FTIR spectrum of thermoset epoxy resin curing from E1DP1.
Figure 3:
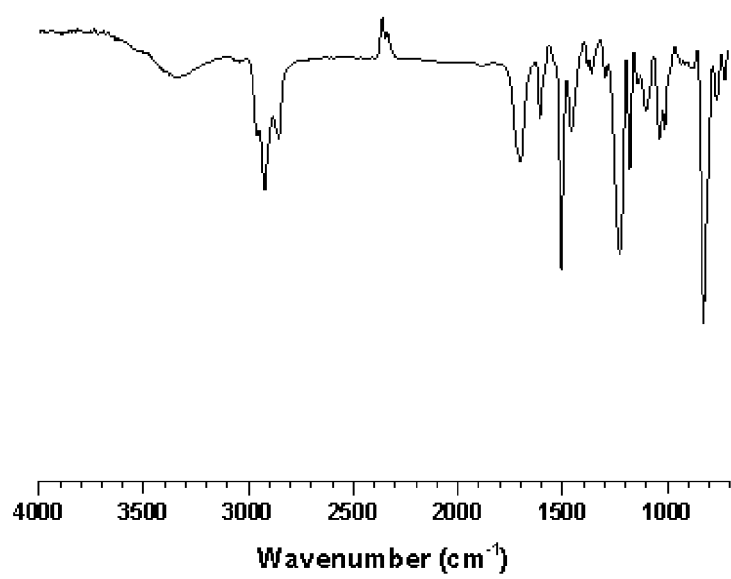
FIG. 3 is FTIR spectrum of thermoset epoxy resin curing from E1DP2.
Figure 4:
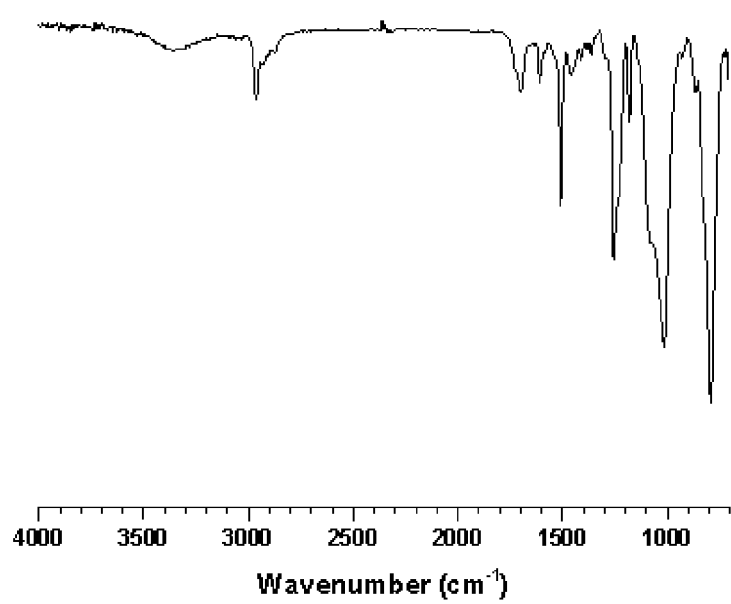
FIG. 4 is FTIR spectrum of thermoset epoxy resin curing from E1DP3.
Figure 5:
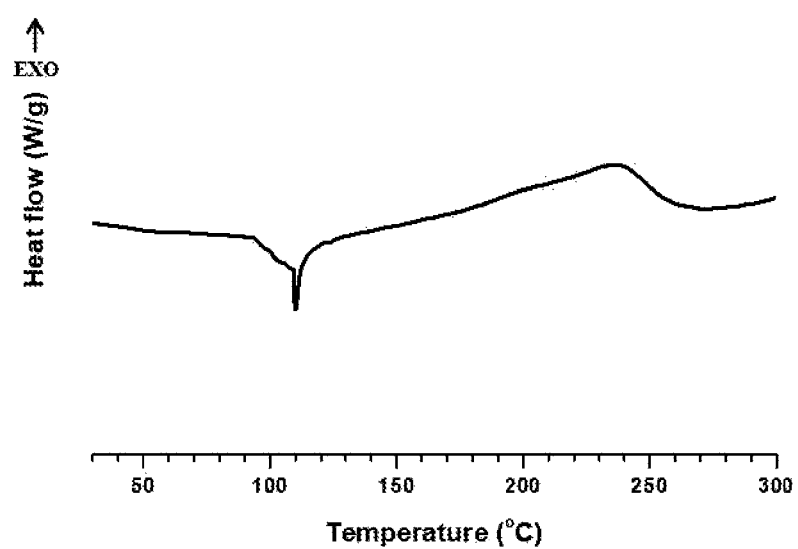
FIG. 5 is a DSC curve of E1BPA.
Figure 6:
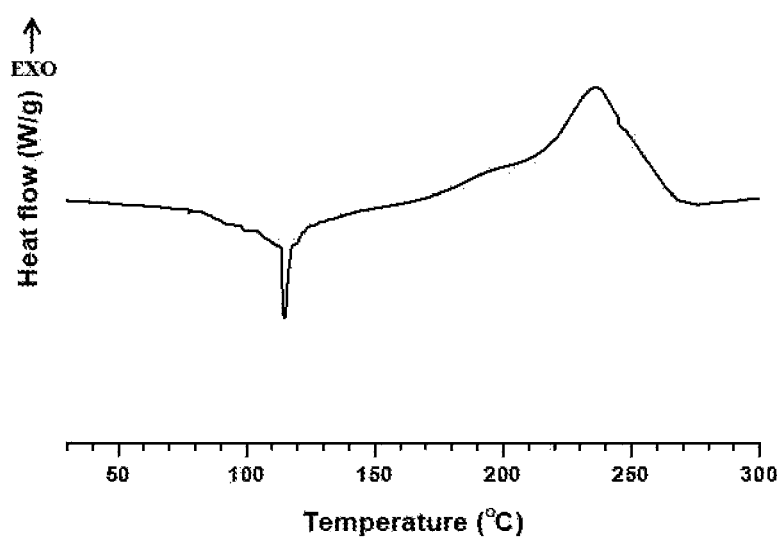
FIG. 6 is a DSC curve of E1DP1.
Figure 7:
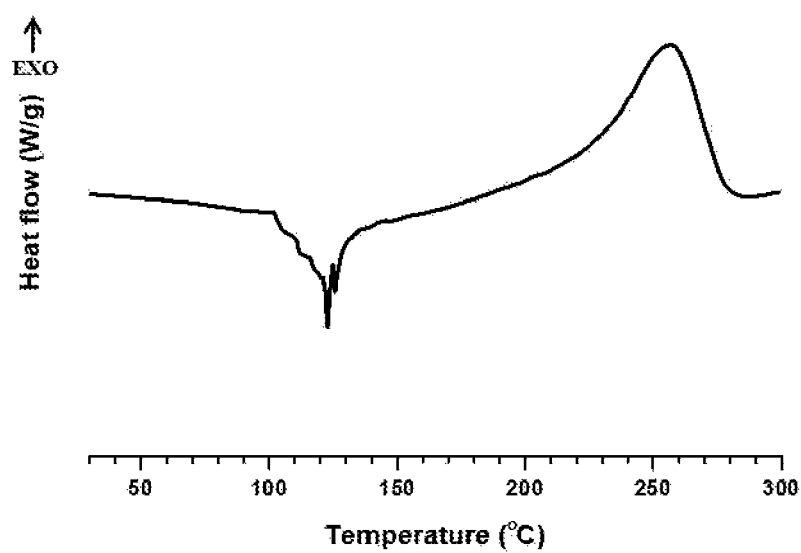
FIG. 7 is a DSC curve of E1DP2.
Figure 8:
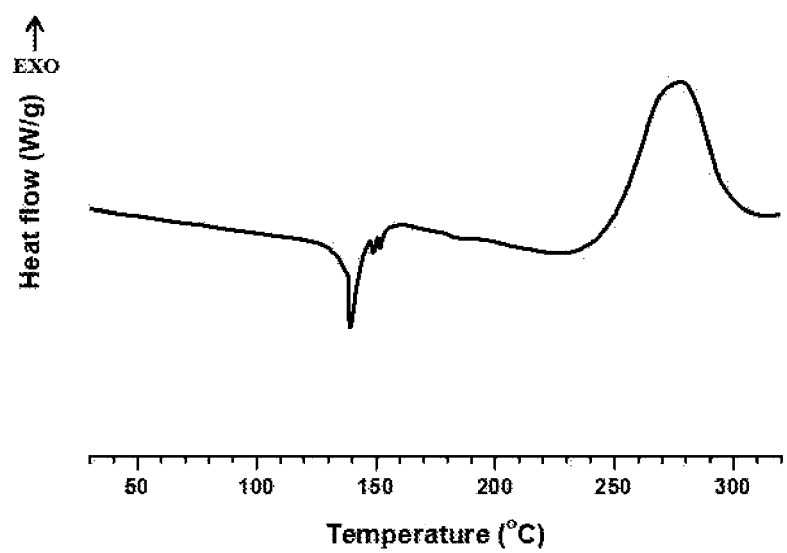
FIG. 8 is a DSC curve of E1DP3
Figure 9:
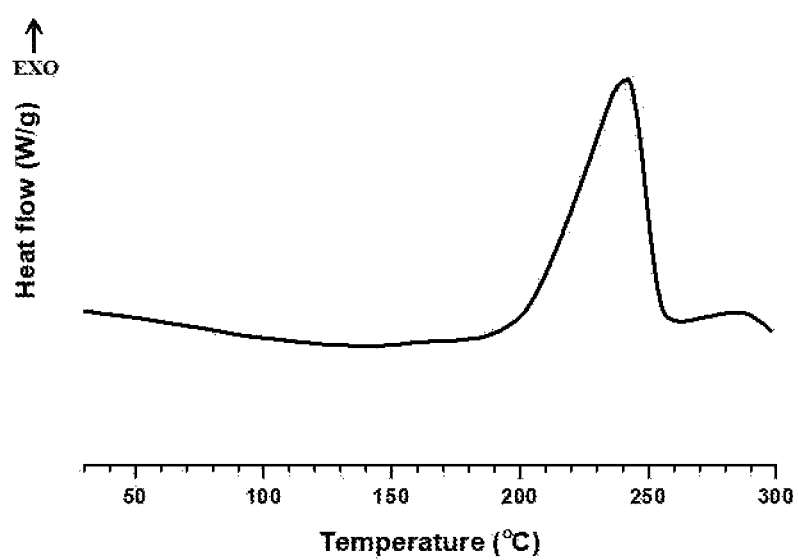
FIG. 9 is a DSC curve of E2DP1.
Figure 10:
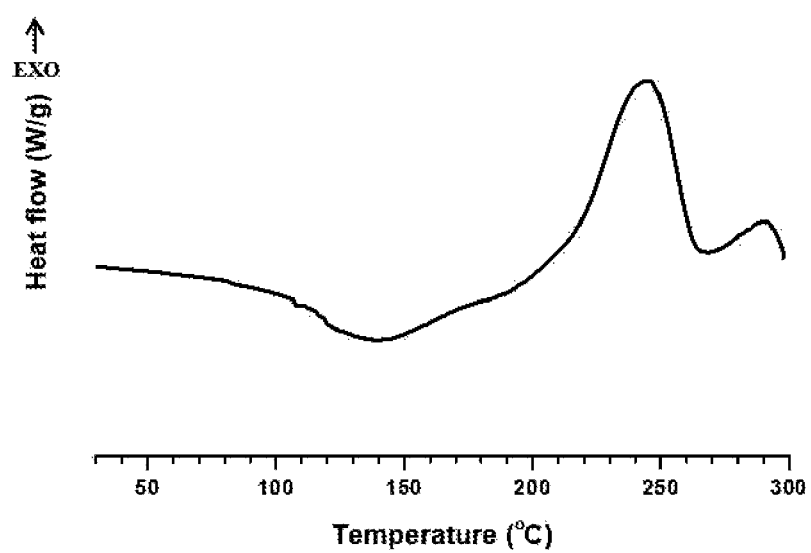
FIG. 10 is a DSC curve of E2DP2.
Figure 11:
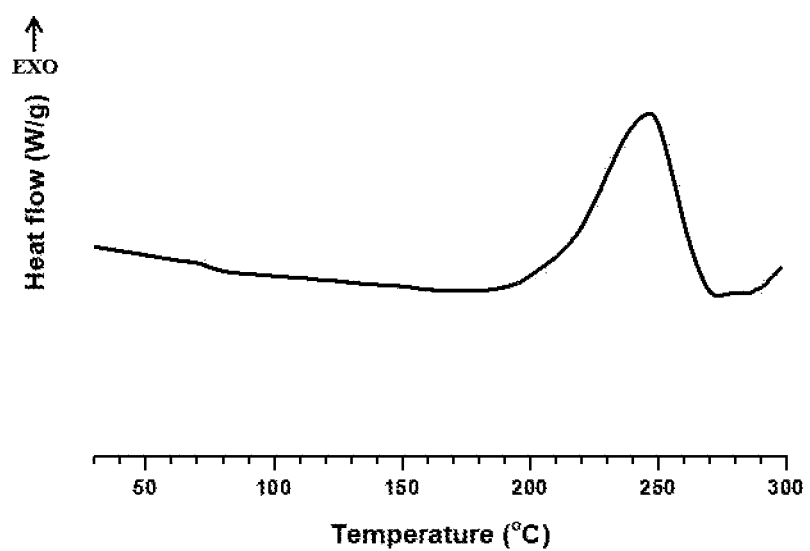
FIG. 11 is a DSC curve of E2DP3.

Structure of the thermoset epoxy resin is characterized by $^1$H-NMR and FTIR, respectively. FTIR spectrums of the thermoset epoxy resin forming from E1DP1, E1DP2 and E1DP3 are shown in FIG. 2, FIG. 3 and FIG. 4, respectively. The peak assignment of FTIR is list in TABLE 3.

TABLE 3

| Assignment | Wavenumber (cm$^{-1}$) |
|---|---|
| Oxirane ring group | 913 |
| —C═O (urethane) | 1715 |
| —C═O (carbonate) | 1775 |
| OH group | ~3300 |

DSC Analysis of the One Component Epoxy Composition

The DSC curves of E1BPA, E1DP1, E1DP2, E1DP3, E2DP1, E2DP2 and E2DP3 are shown as FIG. 5, FIG. 6, FIG. 7, FIG. 8, FIG. 9, FIG. 10, and FIG. 11 respectively. The reaction temperature of the one component epoxy composition is list in TABLE 4. According to the DSC analysis, the suitable reaction temperature range of E1DP1 and E2DP1 is 160~280° C., the suitable reaction temperature range of E1DP2, E2DP2 and E2DP3 is 170~290° C., and the suitable reaction temperature range of E1DP3 is 240~310° C. Specifically, the invented one component epoxy composition have a reaction temperature higher than 150° C., 160° C., 170° C., 180° C., 190° C. or 200° C.

TABLE 4

| One component epoxy composition/ | Reaction temp(° C.) |
|---|---|
| E1BPA | 178.2 |
| E2BPA | x |
| E1DP1 | 213.2 |
| E2DP1 | 204.0 |
| E1DP2 | 227.1 |
| E2DP2 | 217.0 |
| E1DP3 | 249.2 |
| E2DP3 | 209.7 |

Properties of the Thermoset Epoxy Resin

Figure 12:
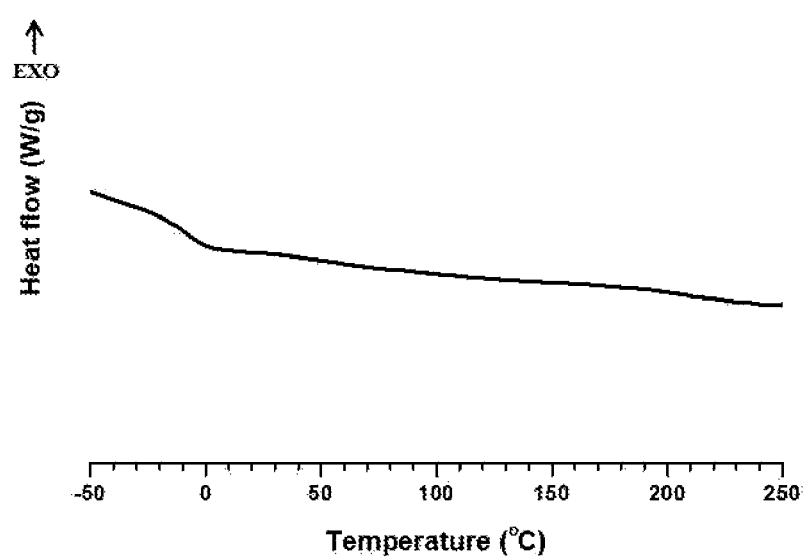
FIG. 12 is a DSC curve of thermoset epoxy resin synthesizing from E2DP3.

The thermal and mechanical properties of the representatively invented thermoset epoxy resin formed by curing the one component epoxy composition are list in TABLE 5. Glass transition temperature (Tg) of the thermoset epoxy resin is measured by DSC analysis. Tg of the invented thermoset epoxy resins have a wide range between −10 and 120° C. One of the thermoset epoxy resin synthesizing from E2DP3 has a DSC curve as shown in FIG. 12 and is a low Tg type epoxy resin. Another one of the thermoset epoxy resin synthesizing from E1DP2 has a DSC curve as shown in FIG. 13 and is a medium Tg type epoxy resin. Still another one of the thermoset epoxy resin synthesizing from E2DP2 has a DSC curve as shown in FIG. 14 and is a high Tg type epoxy resin. Accordingly, the invention provides one component epoxy composition capable of forming a wide Tg range epoxy resin at different curing reaction temperature range.

TABLE 5

| Thermoset epoxy resin no | One component epoxy composition/ | Film formality | Transparency | Tg (° C.) |
|---|---|---|---|---|
| 1 | E1BPA | Brittle | Good | 80.4 |
| 2 | E2BPA | Brittle | Good | 16.1 |
| 3 | E1DP1 | Brittle | Good | 102.8 |
| 4 | E2DP1 | Brittle | Good | 45.1 |
| 5 | E1DP2 | Brittle | Good | 88.4 |
| 6 | E2DP2 | Brittle | Good | 39.6 |
| 7 | E1DP3 | toughness | Good | 39.1 |
| 8 | E2DP3 | toughness | Good | −8.8 |

Stress Measurement of the Thermoset Epoxy Resin

Stress and strain of E1DP3, E2DP3 and E2S430 are measured by tensile testing machine (MTS Landmark 370.02 Test System). The testing method is according to ASTM D638. The tensile rate is 100 mm/min. The results are shown in FIG. 15. Both of E1DP3 and E2DP3 have a strain more than 150% and show good toughness. However, E2S430 has a low strain and fragile during the testing. Accordingly, the invented self-hardener containing siloxane groups is able to make the thermoset epoxy resin with good toughness, high stress and strain.

Obviously many modifications and variations are possible in light of the above teachings. It is therefore to be understood that within the scope of the appended claims the present invention can be practiced otherwise than as specifically described herein. Although specific embodiments have been illustrated and described herein, it is obvious to those skilled in the art that many modifications of the present invention may be made without departing from what is intended to be limited solely by the appended claims.

What is claimed is:

1. A thermoset epoxy resin, having a structure as shown in formula (1)

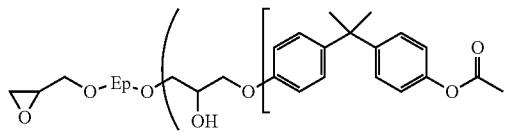
(1)

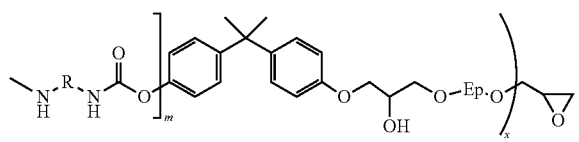

where R is derived from a diaminosiloxane or a polyether diamine;

where Ep has a structure derived from bisphenol A diglycidyl ether or diglycidyl ether of poly(propylene glycol); and where m is an integer of 1-5 and x is a numbers between 1 to 25.

2. The thermoset epoxy resin of claim 1, wherein the diaminosiloxane is a diamino compound containing siloxane groups has a molecular weight between 150 and 10,000 Da.

3. The thermoset epoxy resin of claim 1, wherein the polyether diamine has a weight-average molecular weight between 100 and 5,000 Da.

4. A one component epoxy composition for preparing thermoset epoxy resin of claim 1, comprising a self-hardener having a structure as shown in formula (9) and a epoxy compound, wherein weight ratio of the self-hardener to the epoxy compound is 0.5~20;

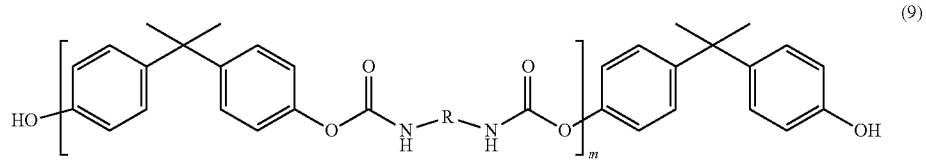
(9)

where R is derived from a diaminosiloxane or a polyether diamine, and m is an integer of 1-5.

5. The one component epoxy composition of claim 4, wherein the diaminosiloxane is an amino compound containing siloxane groups has a molecular weight between 150 and 10,000 Da.

6. The one component epoxy composition of claim 4, wherein the polyether diamine has a weight-average molecular weight between 100 and 5,000 Da.

7. The one component epoxy composition of claim 4, wherein the epoxy compound is bisphenol A diglycidyl ether or diglycidyl ether of poly(propylene glycol).

8. A process for making thermoset epoxy resin containing carbamate groups, comprising: (1) providing a self-hardener having a structure as shown in formula (9) and a epoxy compound, wherein weight ratio of the self-hardener to the epoxy compound is 0.5~20;

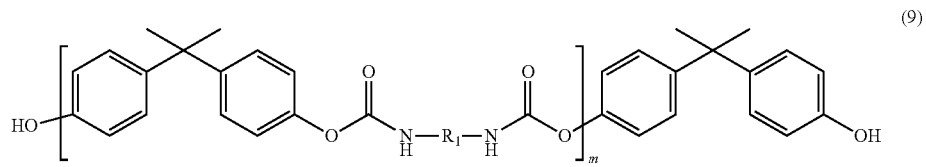
(9)

where R is derived from a diaminosiloxane or a polyether diamine, and m is an integer of 1-5; (2) mixing the self-hardener and the epoxy compound in a solvent to form a pre-epoxy product; and (3) performing a curing reaction to have the pre-epoxy product to form the thermoset epoxy resin containing carbamate groups.

9. The process for making thermoset epoxy resin containing carbamate groups of claim 8, wherein the diaminosiloxane is an amino compound containing siloxane groups has a molecular weight between 150 and 10,000 Da.

10. The process for making thermoset epoxy resin containing carbamate groups of claim 8, wherein the polyether diamine has a weight-average molecular weight between 100 and 5,000 Da.

11. The process for making thermoset epoxy resin containing carbamate groups of claim 8, wherein the epoxy compound is bisphenol A diglycidyl ether or diglycidyl ether of poly(propylene glycol).

12. The process for making thermoset epoxy resin containing carbamate groups of claim 8, wherein the curing reaction is performed between 150 and 350° C.

* * * * *